C. ROST.
DOUBLE ACTING MACHINE FOR MANUFACTURING SWEETS.
APPLICATION FILED JULY 9, 1912.

1,095,031.

Patented Apr. 28, 1914.

Witnesses:
Inventor
Carl Rost
Attorney.

UNITED STATES PATENT OFFICE.

CARL ROST, OF DRESDEN, GERMANY.

DOUBLE-ACTING MACHINE FOR MANUFACTURING SWEETS.

1,095,031.  Specification of Letters Patent.  Patented Apr. 28, 1914.

Application filed July 9, 1912. Serial No. 708,484.

*To all whom it may concern:*

Be it known that I, CARL ROST, a subject of the German Emperor, and resident of Dresden-A., Germany, have invented certain new and useful Improvements in Double-Acting Machines for Manufacturing Sweets, of which the following is a specification.

This invention relates to a machine for manufacturing sweets from one or two sugar columns which are passed in a warm moldable condition between wheels which are provided at their circumference with cutters, for cutting the various sweets and if considered necessary also with dies in order to allow also the manufacture of sweets provided with impressions.

Until now it was usual to construct machines in which the column of sugar is treated in the manner described by means of wheels, in such a manner that always only one set of wheels could be inserted in the machine ready for use so that it was impossible to work at the same time two columns of sugar and that it was necessary for manufacturing another sort of sweets, to change the set of wheels. Compared with this arrangement the device which forms the subject matter of this invention has the advantage that 2 sets of wheels are ready for use at the same time and that therefore two different sorts of sweets can be manufactured without it being necessary to make any changes or alterations. It is possible besides to work in the machine at the same time two columns of sweet paste and thus double the output.

Another particular feature of this invention consists in the improvement of the cutting wheels of the machine, when used for the manufacture of sweets called "berlingots," in which case the cutters of the wheels are arranged so as to be positioned alternately obliquely with reference to each other.

The improvement according to the present invention consists in that the cutters instead of being constructed as separate bodies which are inserted into the wheel body, are made of one piece with the wheel body and are milled out. Owing to this arrangement the life of the cutter wheels is lengthened; they can be manufactured at less cost and with greater exactitude than when the cutters are separately inserted in the rim of the wheel.

The improved sweet manufacturing machine has been shown in the accompanying drawings in which—

Figure 1:
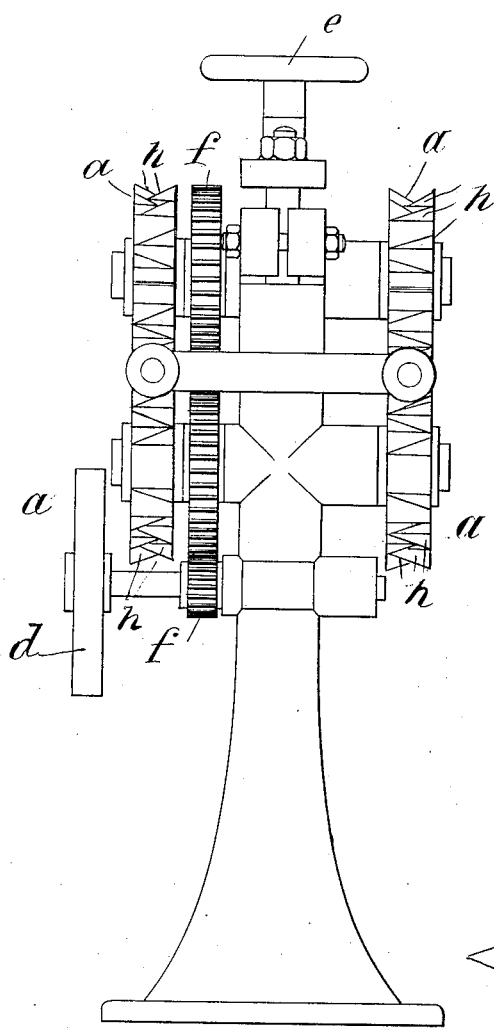
Figure 2:
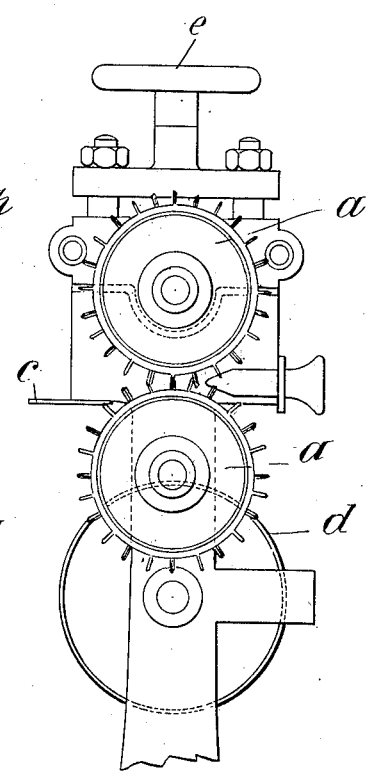
Figure 3:
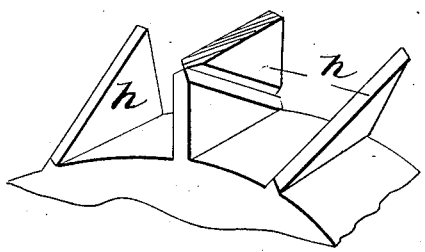

Figure 1 shows a front elevation view of a double acting sweet manufacturing machine constructed according to the principles of the present invention. Fig. 2 is a side elevation. Fig. 3 is a detail perspective view of the cutting teeth.

As shown by Figs. 1 and 2 the sugar columns are introduced through suitable feed nozzles $b$ between the sets of wheels $a$ and are converted into sweets by stamping or cutting dies provided at the circumference of the wheels. The sweets thus obtained leave the machine by passing over a plate $c$ in order to be cooled in a suitable manner. The sets of wheels can be constructed so as to be able to be easily changed.

A suitable adjusting device $e$ has been provided for the purpose of allowing of the distance between the shafts of the wheels $a$ being adjusted according to requirements.

$f$ designates the driving wheels which couple the shafts of the wheels $a$ between each other and convey the driving power from the pulley $d$ to the stamping or die wheels.

As readily seen from Figs. 2 and 3 the cutters $h$ are made integral with the rim $i$ of the wheels $a$ instead of being inserted into said rims. The cutting edges of these cutters $h$ are parallelly directed to the shaft of the wheel $a$ and are alternately inclined to one side and the other at a certain angle which in the example shown in the drawings is for instance an angle of 45° so that two coöperating cutting edges of the two wheels form between each other an angle of 90°.

As will be readily understood the cutters arranged in the manner described will produce in the column of sweet paste passed between coöperating wheels cuts which are alternately shifted 90° to each other whereby the cushion-like so called "berlingot" sweets are produced.

Having now fully described my said invention, what I claim and desire to secure by Letters Patent, is:

In a machine of the class described the combination of a standard, a pair of disks mounted to rotate on the standard, cutting teeth on the periphery of each disk, the outer edge of each tooth being inclined with respect to the axis of the disk, the inclination of alternate teeth on a disk being opposite to the inclination of the remaining teeth on said disk, each set of teeth on one disk being oppositely inclined with relation to the sets of teeth on the other disk whereby the teeth of one disk will lie in a plane with their points at a level with the bases of the teeth upon the other disk, when said teeth are in alinement.

In testimony whereof I have hereunto set my hand in presence of two witnesses.

CARL ROST.

Witnesses:
PAUL ARRAS,
ARTHUR GUBE.

Copies of this patent may be obtained for five cents each, by addressing the "Commissioner of Patents, Washington, D. C."